(12) United States Patent
Tsay

(10) Patent No.: US 11,448,901 B2
(45) Date of Patent: Sep. 20, 2022

(54) ANTI UV420 LENS

(71) Applicant: HE CHENG OPTICAL CO., LTD., Tainan (TW)

(72) Inventor: Tzong-Ju Tsay, Tainan (TW)

(73) Assignee: HE CHENG OPTICAL CO., LTD., Tainan (TW)

(*) Notice: Subject to any disclaimer, the term of this patent is extended or adjusted under 35 U.S.C. 154(b) by 478 days.

(21) Appl. No.: 16/727,914

(22) Filed: Dec. 27, 2019

(65) Prior Publication Data

US 2021/0199994 A1 Jul. 1, 2021

(51) Int. Cl.
*G02C 7/10* (2006.01)
*G02B 1/11* (2015.01)
*C25D 7/00* (2006.01)
*G02B 1/12* (2006.01)
*G02B 1/18* (2015.01)

(52) U.S. Cl.
CPC ............... *G02C 7/104* (2013.01); *C25D 7/00* (2013.01); *G02B 1/11* (2013.01); *G02B 1/12* (2013.01); *G02B 1/18* (2015.01)

(58) Field of Classification Search
CPC .. G02B 1/11; G02B 1/115; G02B 1/18; G02B 1/12; G02B 5/208; C25D 7/00; G02C 7/107; G02C 7/104
See application file for complete search history.

(56) References Cited

U.S. PATENT DOCUMENTS

2015/0146161 A1* 5/2015 Rigato .................... G02C 7/02
                                                              351/159.6
2017/0135860 A1* 5/2017 Lai ......................... A61F 9/022

FOREIGN PATENT DOCUMENTS

| CN | 206133053 U | * | 4/2017 | |
| CN | 206618874 U | * | 11/2017 | |
| CN | 206906719 U | * | 1/2018 | |
| CN | 108107494 A | * | 6/2018 | ............... G02B 1/10 |
| CN | 108318944 A | * | 7/2018 | ............... G02B 1/14 |
| CN | 207946615 U | * | 10/2018 | |
| CN | 208689301 U | * | 4/2019 | |
| DE | 202018002297 U1 | * | 7/2018 | |

* cited by examiner

*Primary Examiner* — Hoan C Nguyen
(74) *Attorney, Agent, or Firm* — Leong C. Lei

(57) ABSTRACT

The present invention proposes an anti UV420 lens, wherein it at least has a substrate at least stacked with a multi-film layer formed by stacking a first antireflection (AR) film layer, silicon dioxide colorless transparent film layer, zirconium dioxide film, trititanium pentoxide (Ti3O5) layer and silicon-aluminum mixture film layer, a waterproof layer is at least stacked on a surface of the multi-film layer, and a second antireflection layer and anti-blue light film layer are at least electroplated on a surface of the anti UV420 lens.

2 Claims, 2 Drawing Sheets

ANTI UV420 LENS

(a) TECHNICAL FIELD OF THE INVENTION

The present invention relates to an anti UV420 lens, having a first antireflection (AR) film, second antireflection (AR) film and anti-blue light film.

(b) DESCRIPTION OF THE PRIOR ART

Current human industry and life are creating pollution to cause the ozone layer that is resistant to blue light and ultraviolet rays to be damaged and weakened by pollution. Therefore, the atmosphere cannot effectively isolate the blue light and ultraviolet rays from the sun, and the blue light and ultraviolet rays that will hurt the eyes will increase in our living environment.

In our living environment, in addition to the high amount of blue light and ultraviolet rays in the sun, there are also optical supplies that are popularized by humans for industrial and commercial needs and daily use, and these popular optical at least include television screens, computer screens, mechanical operation interface video screens, various kinds of portable electronic transmission system PAD and LED and mobile phone electronic product displays, which have one common problem: they can emit blue light with a short wavelength and high energy that can penetrate the eyeball and directly reaches the macula; the macula must be affected by blue light for a long time to cause lesions. In addition, manufacturers of Blu-ray products always increase the intensity of blue light to improve the picture quality in order to make screens clearer and brighter, and with the popularity and widespread penetration of electronic products, it has affected all aspects of life, so the probability of everyone's exposure to blue light has increased dramatically. Furthermore, for the general public, in order to prevent blue light from hurting the eyes, it is best to avoid them exposed to blue light for a long time, which is the most effective way to reduce eye damage, so that a series of lenses with an anti-blue light function are marketed and seize business opportunities. However, the current so-called anti blue lenses generally only can block light with a wave distance less than 400 nm or all long-wavelength blue light, but not all blue light is harmful; the wavelength of the truly harmful blue light is between 400 nm and 440 nm; it has the highest energy and destructiveness especially between 400 nm and 420 nm, having the greatest impact and damage on the macular part of the eyeball. It is aimed at blue light blocking, and manufacturers have seized the corresponding business opportunities. Naturally, many blue light blocking lenses, commonly known as UV lenses, have been bred for spectacles. However, the blue light blocking lenses mainly use substrate absorption or film reflection to achieve the effect of blocking blue light. To block the blue light, it only acts to increase the thickness of the film and simply increase the number of reflective layers.

However, the effect of the substrate absorption or film reflection to block blue light is limited. Naturally, it is necessary to find a better blue light blocking lens composition.

SUMMARY OF THE INVENTION

To overcome the above disadvantages, the present invention is proposed.

One object of the present invention is to provide an anti UV420 lens, stacking a multi-film layer on a substrate to achieve the best anti-blue light effect.

To achieve the above object, the present invention proposes an anti UV420 lens, wherein it at least has a substrate at least stacked with a multi-film layer formed by stacking a first antireflection (AR) film layer, silicon dioxide colorless transparent film layer, zirconium dioxide film, trititanium pentoxide (Ti3O5) layer and silicon-aluminum mixture film layer, a waterproof layer is at least stacked on a surface of the multi-film layer, and a second antireflection layer and anti-blue light film layer are at least electroplated on a surface of the anti UV420 lens.

Whereby, the anti UV420 lens 1 of the present invention is designed to use the first antireflection film layer, second antireflection film and anti-blue light film layer to isolate blue light, allowing the anti UV420 lens to have the effect of blocking high energy blue light between 400 nm and 420 nm and maintain the visual primary color characteristics to a large extent

DETAILED DESCRIPTION OF THE PREFERRED EMBODIMENTS

Figure 1:
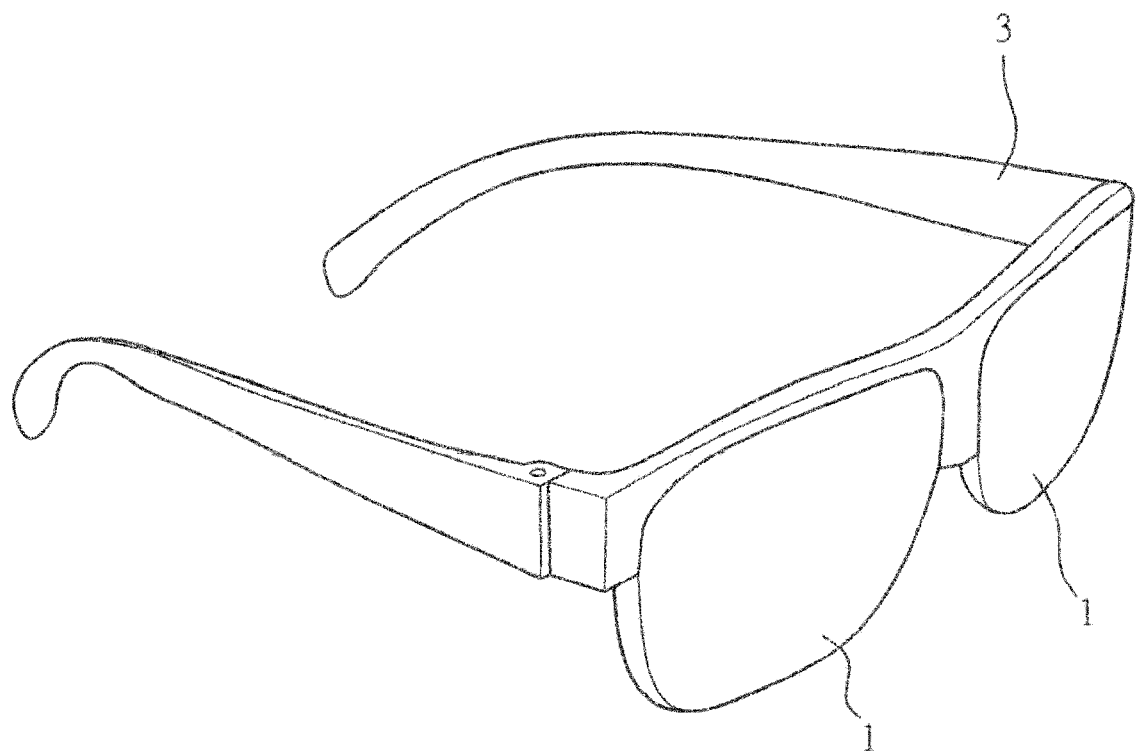
FIG. 1 is a schematically schematic view of a pair of glasses combined with anti UV 420 lenses of the present invention.
Figure 2:
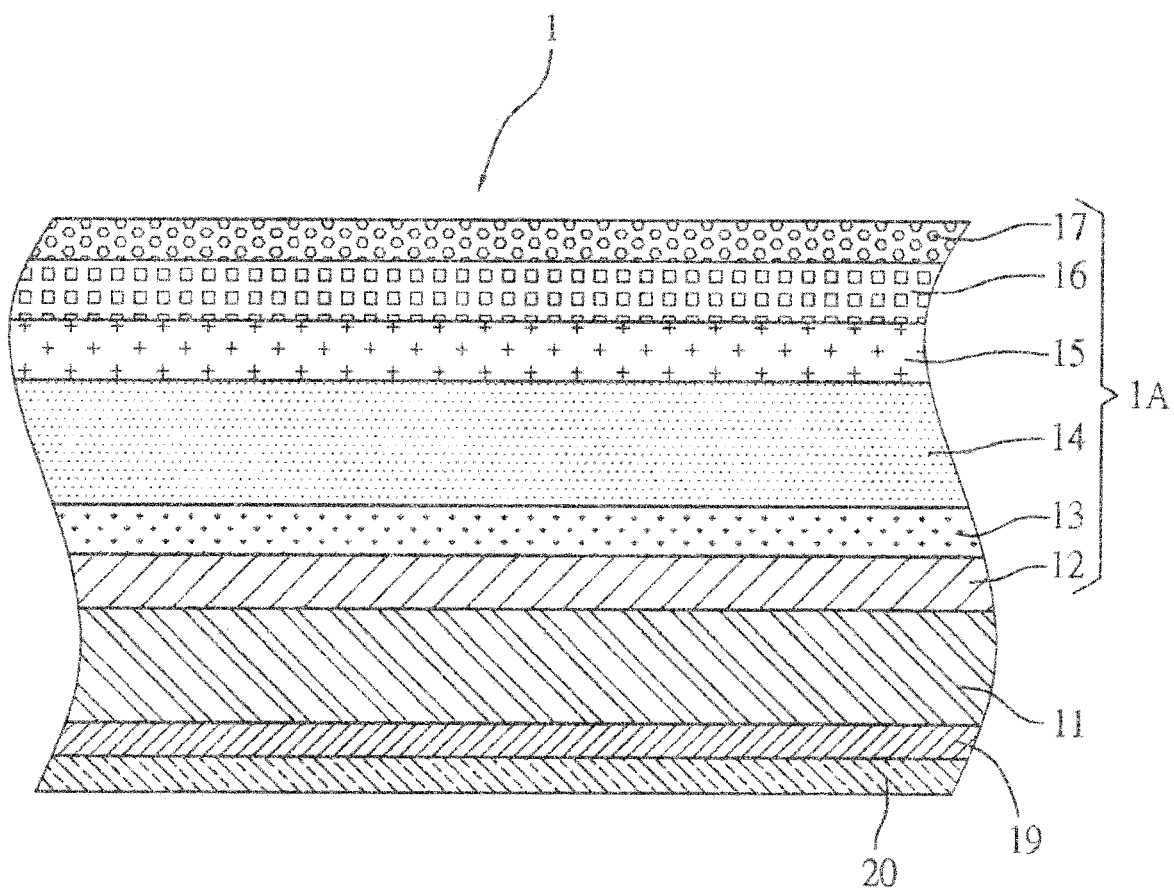
FIG. 2 is a cross-sectional view of the anti UV 420 lens of the present invention.

Referring to FIGS. 1 and 2, an anti UV420 lens 1 at least has a substrate 11, on which a multi-film layer 1A is at least stacked, where the multi-film layer 1A is formed by at least stacking a first antireflection (AR) film layer 12, silicon dioxide colorless transparent film layer 13, zirconium dioxide film 14, trititanium pentoxide (Ti3O5) layer 15 and silicon-aluminum mixture film layer 16 in sequence from bottom to top. Furthermore, a waterproof layer 17 is at least stacked on the surface of multi-film layer 1A, and the lower surface of the anti UV420 lens is at least electroplated with a second antireflection layer 19 and anti-blue light film layer 20 as FIG. 2 shows. Furthermore, the anti UV420 lens 1 so made can exactly be assembled on the front side of a pair of glasses as FIG. 1 shows.

Therefore, the first antireflection (AR) film layer 12, silicon dioxide colorless transparent film layer 13, zirconium dioxide film 14, trititanium pentoxide (Ti3O5) layer 15 and a silicon-aluminum mixture film layer 16 of the multi-film layer 1A, second antireflection layer 19 and anti-blue light film layer 20 of the anti UV420 lens 1 allow the anti UV420 lens to have the effect of blocking high energy blue light and maintain the visual primary color characteristics to a large extent as FIG. 2 shows.

Furthermore, the anti UV420 lens 1 is designed to achieve the isolation of blue light having a wavelength between 400 nm and 420 nm based on the stack of the multi-film layer 1A and the combination of the second anti-reflection film layer 19 and anti-blue light layer 20. Therefore, the anti UV420 lens 1 can be widely used in: anti UV400 to UV420 lenses, PC lenses, PC polarized lenses, nylon lenses, nylon polarized lenses, presbyopia lenses, and asymptotically multifocal presbyopia lenses, where the asymptotically multifocal presbyopia lens generally has a zero diopter or myopia area on the upper half thereof and a presbyopia area on the lower half thereof. in addition, UV400 UV480 lenses, PC lenses, PC polarized lenses, nylon lenses, nylon polarized lenses, presbyopia lenses, asymptotic multifocal presbyopia lenses are not shown and labeled here.

Specifically, the anti UV420 lens 1 of the present invention is designed to use the first antireflection film layer 12, second antireflection film 19 and anti-blue light film layer 20 to isolate blue light, allowing the anti UV420 lens to have the effect of blocking high energy blue light between 400 nm and 420 nm and maintain the visual primary color characteristics to a large extent.

I claim:

1. An anti UV420 lens, wherein it at least has a substrate at least stacked with a multi-film layer formed by stacking a first antireflection (AR) film layer, silicon dioxide colorless transparent film layer, zirconium dioxide film, trititanium pentoxide (Ti3O5) layer and silicon-aluminum mixture film layer, a waterproof layer is at least stacked on a surface of said multi-film layer, and a second antireflection layer and anti-blue light film layer are at least electroplated on a surface of said anti UV420 lens.

2. The lens according to claim 1, wherein said multi-film layer is further at least stacked on said substrate, and said second antireflection film layer is further stacked on a lower side of said substrate, and said anti-blue light film layer is further at least stacked on a lower side of said second antireflection film layer.

\* \* \* \* \*